Nov. 15, 1927.
A. HOLLANDER
1,649,472
PACKING GLAND MECHANISM
Filed May 3, 1926
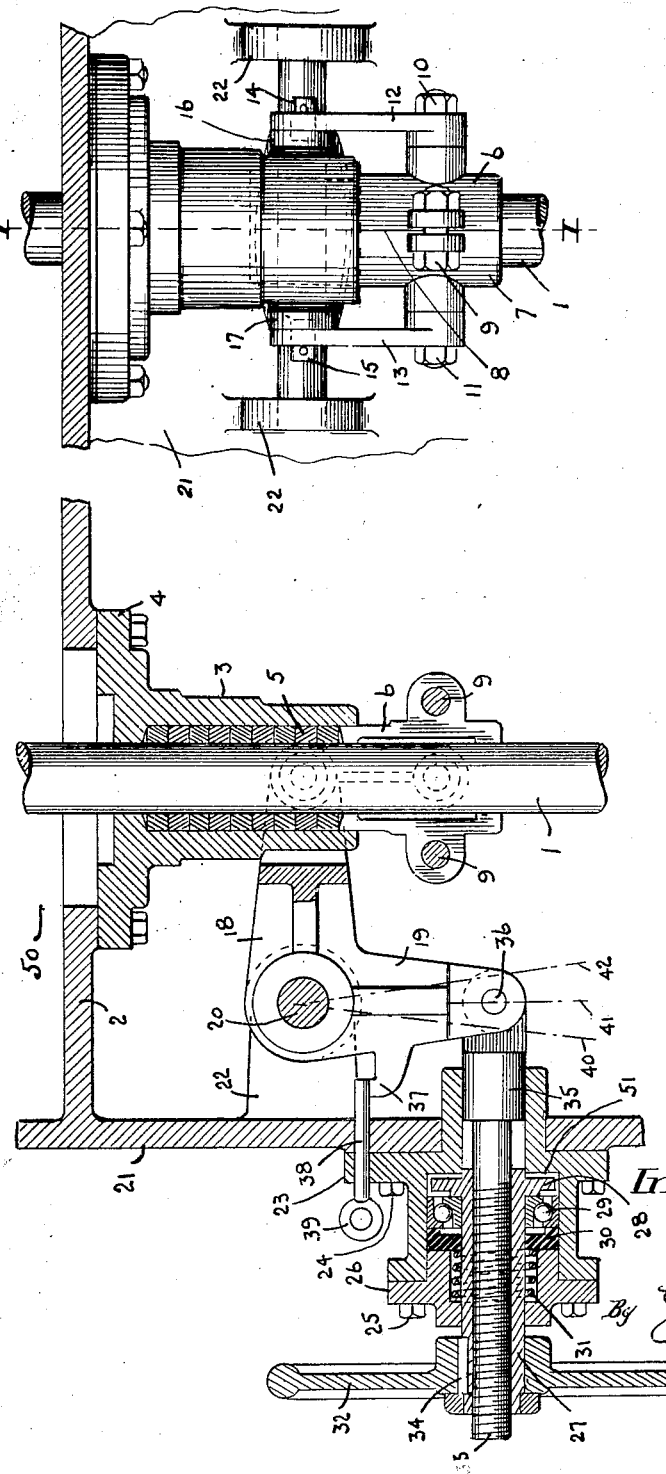
Inventor.
Aladar Hollander
By George J Henry
Attorney.

Patented Nov. 15, 1927.

1,649,472

UNITED STATES PATENT OFFICE.

ALADAR HOLLANDER, OF BERKELEY, CALIFORNIA, ASSIGNOR TO BYRON JACKSON PUMP MFG. CO., OF BERKELEY, CALIFORNIA, A CORPORATION OF CALIFORNIA.

PACKING-GLAND MECHANISM.

Application filed May 3, 1926. Serial No. 106,341.

My invention has for its object a packing gland provided with adjusting and operating mechanism to facilitate the easy re-packing of the gland and its adjustment and also to automatically maintain the packing material packed under a spring pressure at all times so as to take up for wear irregularities and operating conditions.

A further object is a gland which may be most quickly and reliably removed, repacked and replaced.

The packing gland and its associated mechanism of my invention is particularly adapted to high pressure apparatus such as hot oil pumps and the like.

Other objects will appear from the drawing and specifications which follow.

By referring to the drawing, my invention will be made clear.

Fig. 1 is a cross section through a portion of a conventional fluid pressure casing showing the shaft and a packing gland and operating mechanism of my invention.

Fig. 2 is a view of certain of the parts of Fig. 1 and at right angles thereto.

A shaft is indicated by the numeral 1, projecting from a conventional fluid pressure casing, a portion of which is shown at 2, as for example the end plate of a high pressure hot oil pump, such as is set forth in co-pending application Serial No. 57,534 filed September 21, 1925.

It is understood that fluid pressure exists within the casing, as at 50 and it is the primary function of the gland to prevent the escape of said fluid.

At 3 is a collar, or casing end preferably bolted at 4, to the casing 2 and bored out to receive and fitted with packing material at 5.

At 6 and 7 are shown the two halves of a gland which is parted on the line 8 and the halves are normally held bolted around the shaft 1, by the bolts 9, 9.

From the gland halves 6, 7 project the cap screws 10, 11, respectively, on which pivot the side links 12, 13.

These links in turn are carried on the pins 14, 15 which I prefer to rivet or form rigid with a bifurcated lever 18 having the arms 16, 17, and bell crank 19 all of which as a rigid element pivots upon the shaft 20.

This shaft is rigidly supported on the lugs 22, 22 from the depending portion 21 of the casing 2.

Bolted at 24 against the casing portion 21 is the sleeve 23 and having the cap 26 fitted thereto by the bolts 25.

Within the sleeve 23 and cap 26 I provide the nut 27 having the head 28, roller bearing 29, bearing plate 30 and spring 31 the latter initially under compression.

The nut 27 is adapted to be rotated by the hand wheel 32 upon the threaded stem 33, the hand wheel being fixed to the nut by the key 34. The threaded stem 33 is provided with the end 35 engaging through the pin 36 the lever 19.

This latter lever is provided with the shoulder 37 which engages under the pin 38 in the position shown in Fig. 1, before the gland 6, 7 can be withdrawn from the sleeve 3, thus preventing the accidental withdrawal of the gland.

The pin 38 may be withdrawn by grasping the head 39 so as to enable the lever 19 to be pulled inward to its limit as indicted by the position line 40, or when the pin 38 is inserted as shown in Fig. 1, the limits of movement of the lever 19 are between the lines 41 and 42.

The operation is as follows:

Assuming the gland to have been packed with the material 5, and the parts in position shown in Fig. 1, the packing 5 may then be tightened by rotating the hand wheel 32, causing the stem 33 to advance inward and shifting the lever from the full line position 41 towards the line 42.

During this movement the spring 31 is compressed to its limit by the plate 30 riding against the cap 26 and when the packing has been compressed to the desired amount, the spring will also be compressed to its limit and any subsequent wear or movement of the packing 5 is thereafter automatically taken up or corrected by the expansion of the spring 31 which shifts the plate 30, bearing 29, nut head 28 and therefore the nut 27 and stem 33, towards the right of the figure, causing the bifurcated lever 18 to raise the links 12, 13 and therefore the gland 6, 7 held in assembled relation by the bolt 9, in an upward direction further compressing the packing and thus maintaining at all times a constant compressive stress within the packing 5.

If the gland requires re-packing the pin 38 is first removed by withdrawing it by grasping the head 39 and the hand wheel rotated in the opposite direction until the lever 19 occupies the position of the line 40 when the gland will have been entirely withdrawn below the sleeve 3.

The bolts 9, 9 are now removed when the two halves 6, 7 may be removed from the shaft, carrying with them the corresponding links 12, 13 which are now permitted to be withdrawn from the pins 14, 15.

This exposes the packing 5, which may be repaired or replaced and when satisfactorily restored the gland halves 6, 7, are re-assembled as shown in Fig. 2 and the hand wheel rotated to advance the lever 19 from the position 40 up to the position 41 or further towards the line 42 until the required initial compression is attained. The spring 31 is now compressed to its limit as shown in Fig. 1.

The pin 38 is again re-inserted and the parts are ready for operation.

When once properly adjusted as shown for example in Fig. 1, the compression spring retains a constant compressive force against or stress in the packing 5, preventing the leakage and maintaining at all times a properly adjusted and operative packing. This is because of the freedom of movement at 51 allowed for the nut 27 under the action of the spring 31.

Reference is herein made to my co-pending application Serial No. 57,535, filed September 21, 1925, showing other packing gland mechanism.

I claim:

1. Packing gland mechanism comprising a casing member having a bore for packing, a sectional gland telescoping in said member and adapted to compress packing in said bore, hand operable screw means and connections to said gland adapted to compel the movement of said gland with respect to said bore and a spring associated with said screw means and said gland automatically maintaining spring pressure against said gland and therefore against said packing after said packing has been initially compressed, said connections comprising a link means and a double arm lever one arm of which is connected by said link means to said gland and the other arm of which is connected to said screw means.

2. Packing gland mechanism comprising a casing member having a bore for packing, a sectional gland telescoping in said member and adapted to compress packing in said bore, hand operable screw means and connections to said gland adapted to compel the movement of said gland with respect to said bore and a spring associated with said screw means and said gland automatically maintaining spring pressure against said gland and therefore against said packing after said packing has been initially compressed, said connections comprising a link means and a double arm lever one arm of which is connected by said link means to said gland and the other arm of which is connected to said screw means, a safety bolt fixed to limit the movement of said connections to prevent the withdrawal of the gland from the bore and removable to admit of the withdrawal of the gland from the said bore.

3. Packing gland mechanism comprising a casing member having a bore for packing, a sectional gland telescoping in said member and adapted to compress packing in said bore, hand operable screw means and connections to said gland adapted to compel the movement of said gland with respect to said bore and a spring associated with said screw means and said gland automatically maintaining spring pressure against said gland and therefore against said packing after said packing has been initially compressed, said connections comprising a link means and a double arm lever one arm of which is connected by said link means to said gland and the other arm of which is connected to said screw means, a safety bolt fixed to limit the movement of said connections to prevent the withdrawal of the gland from the bore and removable to admit of the withdrawal of the gland from the said bore, said screw means comprising a threaded rod which engages the last mentioned arm and a hand rotatable nut on said rod, said nut supported from said casing with a freedom of axial movement and said spring means interposed between the said nut and said casing.

ALADAR HOLLANDER.